(12) United States Patent
Marshall

(10) Patent No.: US 8,347,513 B2
(45) Date of Patent: Jan. 8, 2013

(54) HAND-HELD SAW WITH RIGID FRAME

(76) Inventor: Buster Lee Marshall, Santa Cruz, CA (US)

( * ) Notice: Subject to any disclaimer, the term of this patent is extended or adjusted under 35 U.S.C. 154(b) by 0 days.

(21) Appl. No.: 12/975,246

(22) Filed: Dec. 21, 2010

(65) Prior Publication Data

US 2012/0151783 A1  Jun. 21, 2012

(51) Int. Cl.
| | |
|---|---|
| B23D 45/00 | (2006.01) |
| B23D 49/00 | (2006.01) |
| B27B 5/29 | (2006.01) |
| B27B 19/09 | (2006.01) |
| B27B 3/12 | (2006.01) |
| B27B 25/00 | (2006.01) |
| B27B 33/20 | (2006.01) |
| B27B 21/02 | (2006.01) |

(52) U.S. Cl. .............................. 30/392; 30/166.3; 30/506
(58) Field of Classification Search ..................... 30/392, 30/166.3, 506–507; B27B 19/00, 21/06; B23D 49/00, 49/12, 51/12, 51/02
See application file for complete search history.

(56) References Cited

U.S. PATENT DOCUMENTS

| | | | | | |
|---|---|---|---|---|---|
| 280,928 | A | * | 7/1883 | Hoffman | 30/513 |
| 499,227 | A | * | 6/1893 | Horne | 30/510 |
| 1,792,024 | A | * | 2/1931 | Maly | 30/510 |
| 2,213,841 | A | * | 9/1940 | Hubeck | 30/513 |
| 2,330,854 | A | * | 10/1943 | Wolfard | 30/506 |
| 2,795,251 | A | * | 6/1957 | Oleksy | 30/509 |
| 2,974,698 | A | * | 3/1961 | Drew | 30/507 |
| 3,002,542 | A | * | 10/1961 | Dreier | 30/513 |
| 3,082,803 | A | * | 3/1963 | Dickstein | 30/511 |
| 4,364,174 | A | * | 12/1982 | De Asis | 30/153 |
| 4,592,145 | A | * | 6/1986 | Egan et al. | 30/507 |
| 5,369,887 | A | * | 12/1994 | Keevers | 30/394 |
| 5,722,173 | A | * | 3/1998 | Huang | 30/510 |
| 5,924,209 | A | * | 7/1999 | Ward | 30/392 |
| 6,070,330 | A | * | 6/2000 | Phelon et al. | 30/513 |
| 6,098,294 | A | * | 8/2000 | Lemos | 30/513 |
| 6,266,887 | B1 | * | 7/2001 | Owens et al. | 30/513 |
| 6,401,346 | B1 | * | 6/2002 | Roberts | 30/380 |
| 6,742,215 | B2 | * | 6/2004 | Panfili et al. | 15/236.01 |
| 6,772,522 | B1 | * | 8/2004 | Huang et al. | 30/513 |
| 6,925,720 | B2 | * | 8/2005 | Ranieri | 30/513 |
| 7,254,893 | B1 | | 8/2007 | Huang | |
| 7,415,745 | B2 | * | 8/2008 | Rivera | 7/128 |
| 2004/0020062 | A1 | * | 2/2004 | Ducret | 30/512 |
| 2005/0252007 | A1 | * | 11/2005 | Critelli et al. | 30/166.3 |
| 2006/0168825 | A1 | * | 8/2006 | Tseng | 30/513 |

FOREIGN PATENT DOCUMENTS

| | | |
|---|---|---|
| CN | 1695858 A | 11/2005 |
| CN | 1709622 A | 12/2005 |
| CN | 2820403 Y | 9/2006 |
| CN | 100349681 C | 11/2007 |
| CN | 201049404 Y | 4/2008 |
| CN | 201058386 Y | 5/2008 |
| CN | 101530932 A | 9/2009 |
| CN | 101530934 A | 9/2009 |
| DE | 3248584 A1 * | 7/1984 |

* cited by examiner

*Primary Examiner* — Ghassem Alie
*Assistant Examiner* — Bharat C Patel
(74) *Attorney, Agent, or Firm* — Morrison & Foerster LLP

(57) ABSTRACT

A hand-held saw with a rigid saw frame is disclosed. The rigid frame of the hand-held saw allows a saw blade to remain highly tensioned during the cutting process. The rigid saw frame has a "C-shape," is unbent, and contains openings that make up a truss-like structure, which distributes an external force that is focused on one portion of the saw frame across other portions of the saw frame.

12 Claims, 7 Drawing Sheets

HAND-HELD SAW WITH RIGID FRAME

BACKGROUND

1. Field

The present application generally relates to hand-held saws for cutting delicate designs on materials such as metal and wood. More particularly, the present application relates to a hand-held saw having a C-shaped frame for a tensioned blade, such as a coping saw or a fret saw, that allows a user to cut delicate designs accurately.

2. Related Art

When cutting with a hand-held saw, friction between the saw blade of the hand-held saw and the material being cut creates a resistance to any movement of the saw. To continue cutting, a user typically overcomes the resistance by exerting pressure on the hand-held saw and the saw blade. Since the saw blade is in contact with the material being cut, the force exerted by the user tends to bend the blade. A bent saw blade produces inaccurate cuts, and will eventually break if it is sufficiently bent.

A saw blade is typically coupled to a saw frame under tension in order to reduce the amount of bending, or flex, experienced by the blade. However, the tensioning of a saw blade creates an opposite pressure against the saw frame. Due to the elongated bow shape of the typical saw frame, this pressure tends to compress the side of the saw frame that is coupled to the blade. As the saw frame compresses, the distance between the distal and proximal ends of the saw frame is reduced, and the tensile force exerted on the saw blade is proportionately decreased. Thus, compression of the saw frame reduces blade tension, and is therefore undesirable.

The amount by which a saw frame compresses depends on the design and the material of the saw frame. A typical saw frame is made from a metal rod, bent into an elongated bow shape, commonly referred to as a "C-shape." FIG. A shows graphically one example of a hand-held saw made from a metal rod that is bent and flattened. The bending process introduces metal fatigue and internal deformities in the saw frame, and reduces the overall rigidity of the saw frame. Thus, saw frames produced by bending rely on, but do not take full advantage of, the inherent strength of the material employed.

Some hand-held saws address the problem of frame rigidity by using heavier metals, or by using additional amounts of metal, in their construction. Both of these practices increase the weight of the saw frame, which not only increases the overall weight of the resulting saw, but also upsets the weight balance of the saw frame in relation to the lighter saw blade. These results are undesirable. First, a heavier saw is more physically demanding of its user. Second, it is difficult for a user to position the saw blade of a frame-heavy saw to perform a delicate cut.

SUMMARY

In one embodiment, a hand-held saw is produced with a saw frame having a proximal end and a distal end, wherein the saw frame is a single piece, in a C-shape, is unbent, and has one or more openings formed therein, wherein the C-shape saw frame has a left side, a top side, and a right side. A first saw blade coupling device is disposed at the distal end of the saw frame, a second saw blade coupling device is disposed at the proximal end of the saw frame, and a saw blade is coupled to the saw frame at the first saw blade coupling device and the second saw blade coupling device. A handle is coupled to the proximal end of the saw frame, wherein the handle is oriented such that an axis defined by a length of the handle is aligned with an axis defined by the first saw blade coupling device and the second saw blade coupling device.

In another embodiment, a hand-held saw is produced with a saw frame having a proximal end and a distal end, wherein the saw frame is a single piece, in a C-shape, is unbent, and has one or more openings formed therein, wherein the C-shape saw frame has a left side, a top side, and a right side. A first saw blade coupling device is disposed at the distal end of the saw frame, and a second saw blade coupling device is disposed at the proximal end of the saw frame, wherein the first saw blade coupling device and the second saw blade coupling device are oriented to couple with a saw blade. A handle is coupled to the proximal end of the saw frame, wherein the handle is oriented such that an axis defined by a length of the handle is aligned with an axis defined by the first saw blade coupling device and the second saw blade coupling device.

In another embodiment, a method of fabricating a hand-held saw comprises obtaining a saw frame having a proximal end and a distal end, wherein the saw frame is a single piece, in a C-shape, is unbent, and has one or more openings formed therein, wherein the C-shape saw frame has a left side, a top side, and a right side. The method further comprises connecting a first saw blade coupling device to the distal end of the saw frame, connecting a second saw blade coupling device to the proximal end of the saw frame, wherein the first saw blade coupling device and the second saw blade coupling device are oriented to couple with a saw blade. The method further comprises coupling a handle to the proximal end of the saw frame, wherein the handle is oriented such that an axis defined by a length of the handle is aligned with an axis defined by the first saw blade coupling device and the second saw blade coupling device.

DETAILED DESCRIPTION

Figure 1:
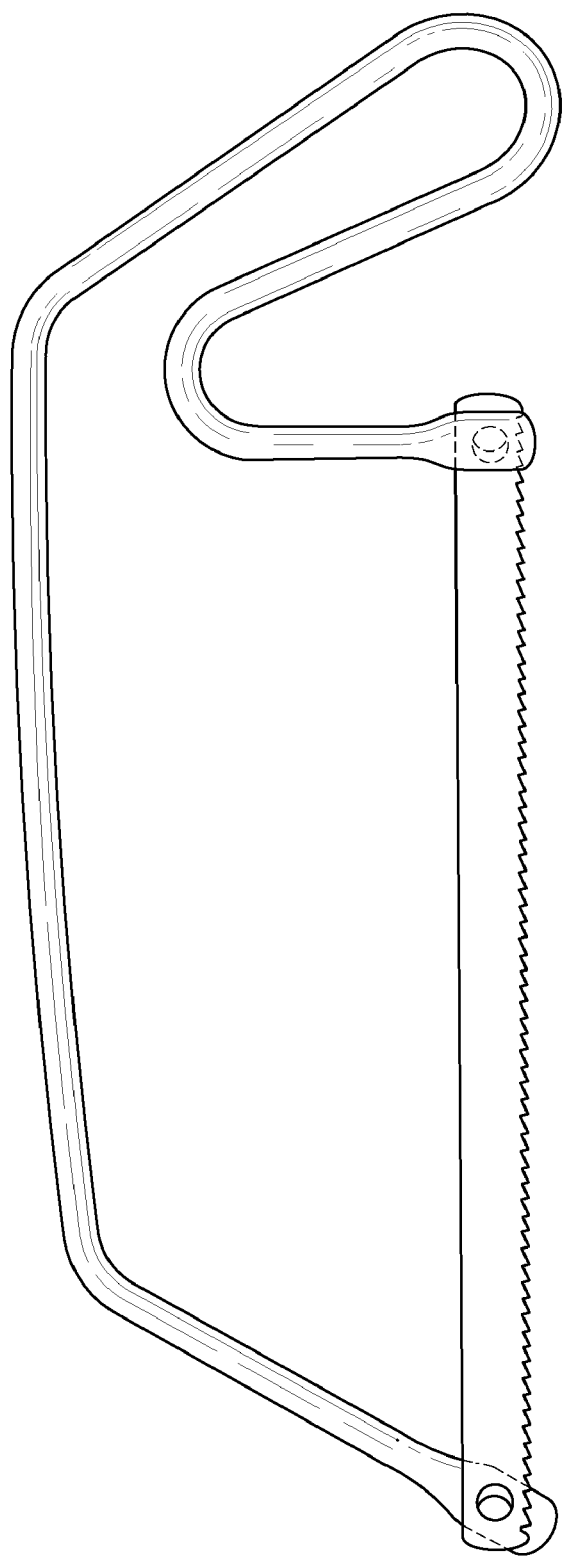
FIG. 1 is a side view of a prior art hand-held saw, with a saw frame that is fabricated from a metal rod that is bent and flattened.
Figure 2:
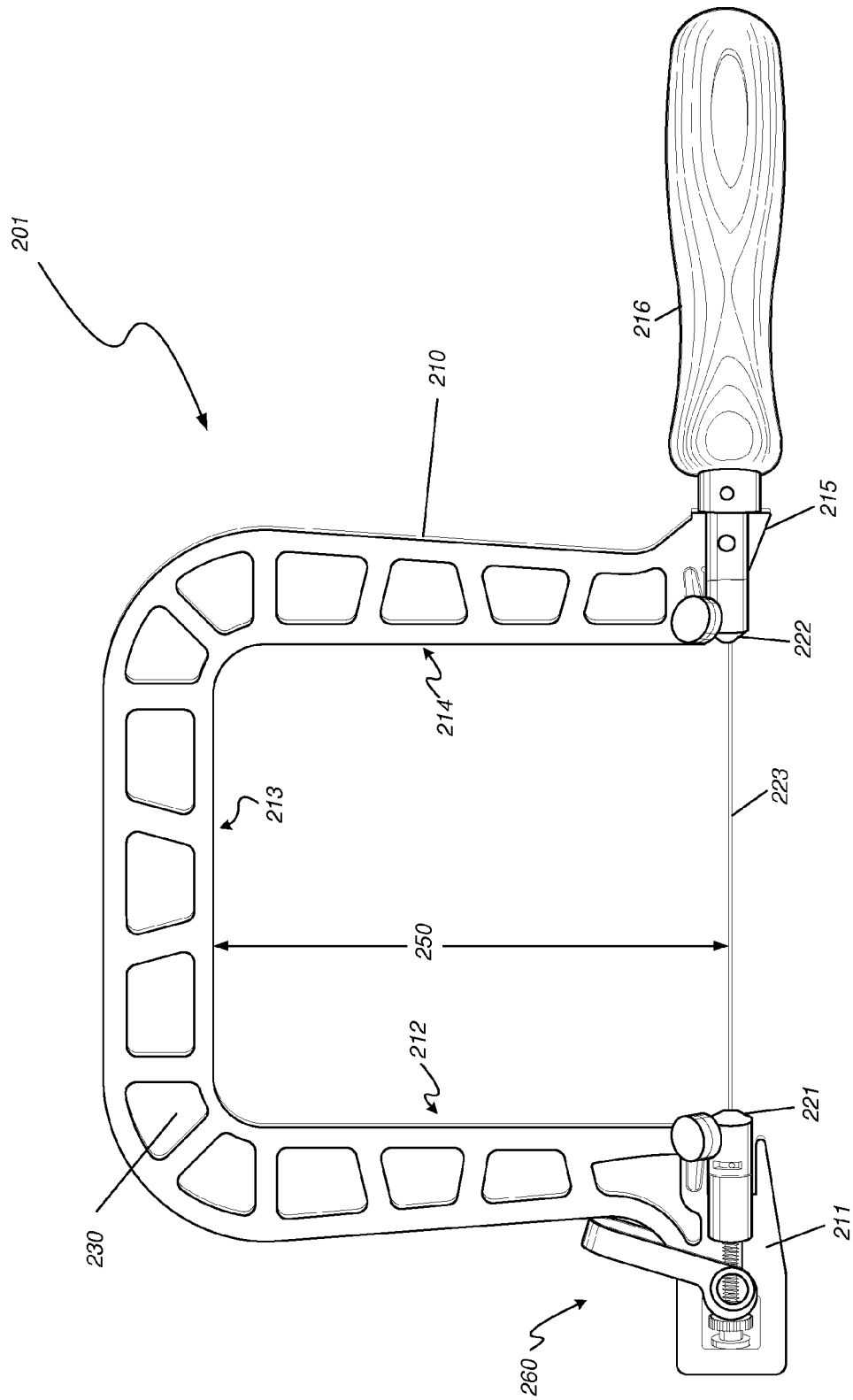
FIG. 2 is a side view of a hand-held saw.

FIG. 2 depicts an exemplary embodiment of a hand-held saw 201, which includes a rigid saw frame 210 in the shape of an elongated bow, commonly referred to as a "C-shape." Saw frame 210 has distal end 211, left side 212, top side 213, right side 214, and proximal end 215. Left side 212, top side 213, and right side 214 form the "C-shape" of saw frame 210. Distal end 211 and proximal end 215 of saw frame 210 are separated by approximately the length of a saw blade. A saw blade 223 is attached to saw frame 210 via coupling devices 221 and 222, located at distal and proximal ends 211 and 215 of saw frame 210, respectively. To allow the attachment of saw blade 223, coupling devices 221 and 222 are oriented such that their saw blade receiving ends face one another and are aligned along the same axis. A saw blade tensioning device 260 is attached between distal end 211 of saw frame 210 and distal saw blade coupling device 221. Proximal saw blade coupling device 222 is connected directly to saw frame 210. Finally, a handle 216 is attached to proximal end 215 of saw frame 210.

1. Saw Frame

As mentioned above, saw frame 210 is shaped as an elongated bow, commonly referred to as a "C-shape." Hand-held saws having a saw frame with this shape are typically referred to as "coping saws," "fret saws," or "jeweler's saws." It should be recognized that saw frame 210 does not need to be a precise "C" shape. For example, saw frame 210 can resemble more of an "open-D" shape.

The advantage of the elongated bow shape of saw frame 210 is to provide clearance space 250 between saw blade 223 and top side 213 of saw frame 210. During the cutting process, clearance space 250 allows room for excess material to pass through the hand-held saw without hindrance from saw frame 210. The excess material may be an extrusion from a part of the material that is being cut. In the present embodiment, the saw frame is shaped such that the clearance spaces as measured at distal and proximal ends 211 and 215 of saw frame 210 are approximately symmetric. However, in an alternative embodiment, clearance space 250 may differ at the distal and proximal ends 211 and 215 of saw frame 210. One skilled in the art will appreciate that a C-shaped saw frame may include additional sides or features, so long as saw frame 210 continues to provide clearance space 250 between saw blade 223 and saw frame 210 for the cutting process.

In the present embodiment, saw frame 210 is a single piece. Also, saw frame 210 is unbent, meaning that it was not formed by being bent into a C-shape. Rather, in the present embodiment, saw frame 210 is cut from a sheet of metal. For example, saw frame 210 may be fabricated from a sheet or plate of metal using techniques such as laser cutting or water-jet cutting. The process of cutting saw frame 210 from a sheet of metal avoids the problems of metal fatigue and internal deformities that are introduced by the process of bending. Because metal fatigue and internal deformities both weaken the strength of a metal, saw frame 210, which is unbent, is more able to retain the inherent strength of the metal.

It should be recognized that various fabrication processes other than cutting saw frame 210 from a sheet of metal can be used to fabricate saw frame 210, while not bending saw frame 210 into a C-shape. For instance, in another embodiment, saw frame 210 is molded using a molding process. The molding process can produce saw frame 210 from materials such as metal, carbon fiber, and synthetic fibers. For instance, in another embodiment, saw frame 210 is cast using a casting process. The casting process can also produce saw frame 210 from materials such as metal, carbon fiber, and synthetic fibers. The processes of molding and casting saw frame 210 both avoid the problems of metal fatigue and internal deformities that are introduced by the bending process.

A number of metals, including aluminum (such as standard grade 6061-T6) and titanium, may be used to fabricate saw frame 210. The metal may be also heat-treated to produce additional strength. One skilled in the art will recognize that other metals or metal alloys may be used to produce saw frame 210. One skilled in the art will recognize that non-metals may also be used to produce saw frame 210. Examples of non-metals that may be used include, but are not limited to, carbon fiber, synthetic fibers, plastics, and so forth.

2. Truss-Like Structure

Figure 3:
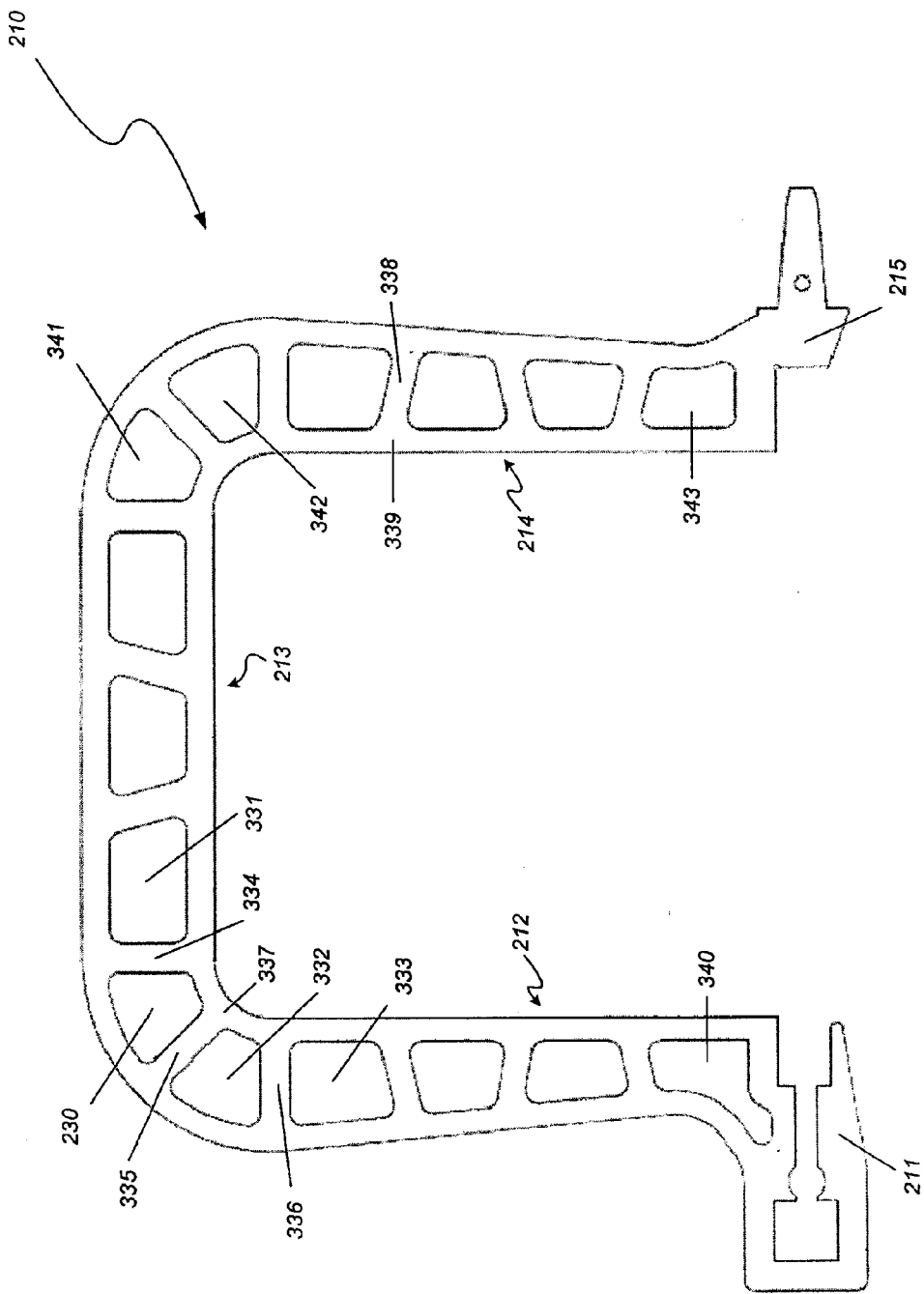
FIG. 3 is a side view of a saw frame of the hand-held saw of FIG. 2.

As depicted in FIG. 3, in the present embodiment, saw frame 210 includes one or more openings. The openings formed in saw frame 210 reduce the amount of metal used, and thus lowers the overall weight of hand-held saw 210, while maintaining the desirable amount of saw frame rigidity.

In the present embodiment, the openings on saw frame 210 are positioned such that the remaining uncut metal material of saw frame 210 form a truss-like structure. A truss-like structure comprises openings defined by straight members whose ends may be connected at joints, referred to as nodes. A truss-like structure is similar to a conventional truss structure; however, in a truss-like structure, it is possible but not necessary that an opening be triangular, and it is possible but not necessary for straight members to be connected to each other at nodes.

In particular, still referring to FIG. 3, exemplary openings 230 and 332 are formed at the corner between left side 212 and top side 213 of saw frame 210. Openings 230 and 332 are positioned such that a straight member 335 is formed. Similarly, openings 230 and 331 are positioned to form another straight member 334, and openings 332 and 333 form straight member 336. Also, openings 341 and 342 are formed at the corner between right side 214 and top side 213 of saw frame 210. Straight members 334, 335, and 336 converge at a node 337 to form a truss-like structure. As mentioned above, it is possible but not necessary for the straight members of a truss-like structure to converge at nodes. For instance, straight member 338 of saw frame 210 does not connect with another straight member at node 339. Also, as mentioned above, the openings in a truss-like structure may be triangular or non-triangular in shape. For example, opening 230 on saw frame 210 is triangular, opening 331 is rectangular, and opening 340 is multisided.

The truss-like structure of saw frame 210 converts an external force that is applied to saw frame 210 at distal end 211 and proximal end 215 into tensile and compression forces against many, if not all, of the straight members of the truss-like structure. Experiments using polarized photography have demonstrated that an external force applied to distal and proximal ends 211 and 215 of saw frame 210 is borne by many of the straight members of the saw frame's truss-like structure. Since the tensioning of saw blade 223 on saw frame 210 exerts a similar force against distal and proximal ends 211 and 215 of saw frame 210, the truss-like structure of saw frame 210 is able to distribute the pressure caused by the tensioning of saw blade 223 across many, if not all, of the straight members of saw frame 210.

Figure 5:
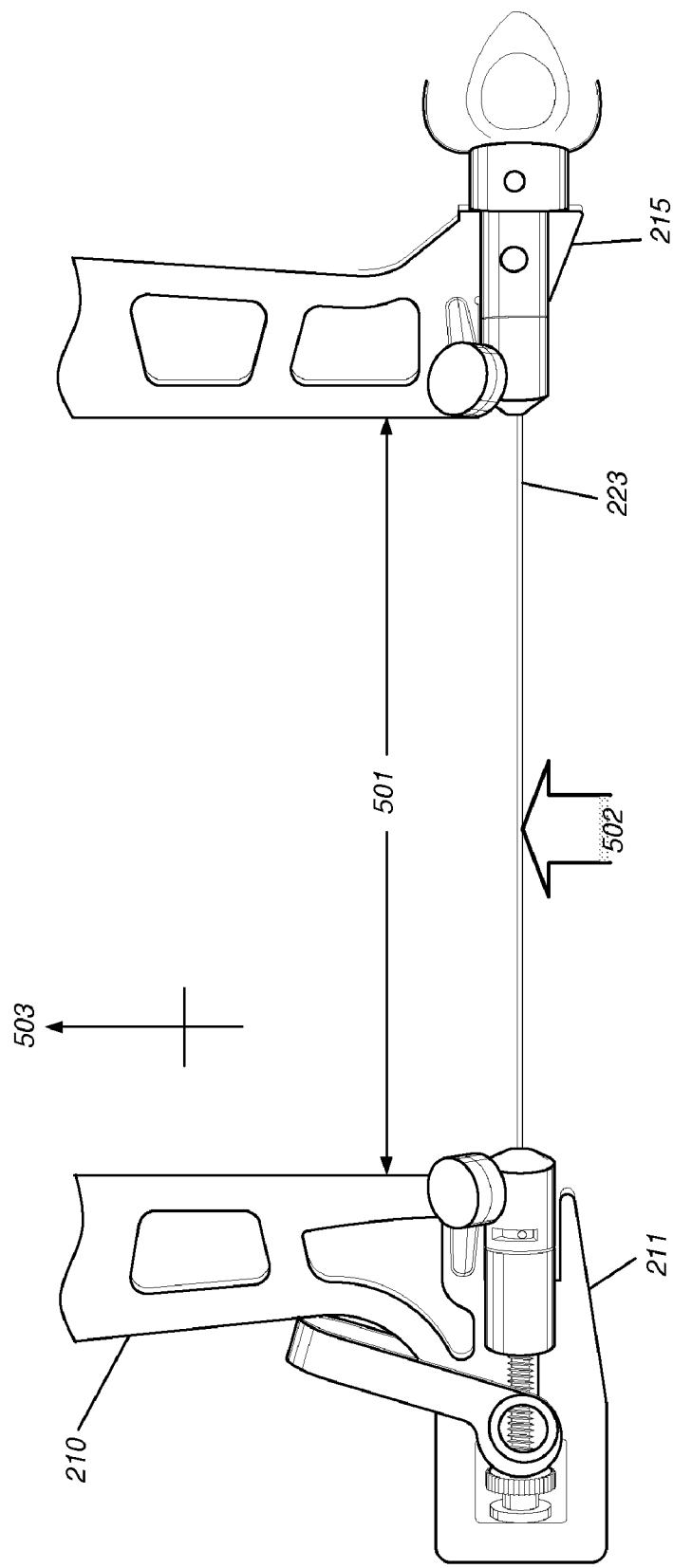
FIG. 5 is a side view depicting the saw frame depicted in FIG. 2

The ability of the truss-like structure of saw frame 210 to distribute external forces applied to saw frame 210 across the truss-like structure increases the rigidity of saw frame 210. Experiments have also demonstrated the ability of saw frame 210, with a truss-like structure, to withstand external forces without resulting in significant compression. Referring now to FIG. 5, compression of saw frame 210 is quantified as a reduction in distance 501 between distal end 211 and proximal end 215 of saw frame 210, due to the application of an external force 502 onto saw blade 223 in a perpendicular direction 503. In one phase of the experiment, a force of one pound is applied to saw blade 223 of three saws: a saw with a conventional steel frame, a saw with a modified truss-like aluminum frame, and a saw modified truss-like titanium frame. In a second phase of the experiment, two pounds of force 502 are applied to the same saw frames. Compression of the different saw frames due to the applied pressure are documented in Table 1.

TABLE 1

|  | 1 lb. | 2 lbs. |
| --- | --- | --- |
| Conventional steel frame | 0.007 inch of compression | 0.021 in. |
| Truss-like aluminum frame | 0.002 in. | 0.003 in. |
| Truss-like titanium frame | 0.0005 in. | 0.0015 in. |

Referring now to Table 1, the truss-like aluminum and titanium saw frames are significantly more resistant to compression than the conventional steel frame. For instance, the steel frame compresses by 0.021 inches when two pounds of pressure is applied to the saw blade. By comparison, a truss-like aluminum frame compresses by 0.003 inches, and a truss-like titanium frame compresses by 0.0015 inches, when placed under the same pressure. Put another way, a conventional steel saw frame compresses fourteen times as much as the truss-like titanium saw frame, and seven times as much as the truss-like aluminum saw frame, when the blade of the saw is subjected to two pounds of pressure.

The ability of saw frame 210 to withstand significant external forces without resulting in saw frame compression allows saw blade 223 to be highly tensioned. The rigidity of saw frame 210 also allows saw blade 223 to remain highly tensioned as additional pressure is applied to the saw during the cutting process. As mentioned above, a highly tensioned saw blade is desirable because it reduces saw blade flex during the cutting process, and thereby increases the accuracy of the cuts made, and reduces saw blade breakage.

3. Location of Openings

Referring again to FIG. 3, the truss-like structure of saw frame 210 allows metallic material to be removed from saw frame 210, thus lowering the overall weight of hand-held saw 201, while strengthening the overall rigidity of saw frame 210.

Importantly, the use of a truss-like structure allows metal material to be removed from the portions of saw frame 210 that, traditionally, would be expected to bear the most pressure during use. For instance, openings 230 and 332 of saw frame 210 are located at the corner between left side 212 and top side 213 of saw frame 210. In a C-shaped saw frame of conventional construction (i.e., bent), the corner portions of the saw frame would be expected to bear the most pressure from the tensioning and use of a saw blade. In contrast, the truss-like structure of saw frame 210 is able to distribute an external force, borne by the corner between openings 230 and 332, across many, if not all, of straight members of the truss-like structure. Thus, the truss-like structure of saw frame 210 allows metallic material to be removed from the various portions of saw frame 210, including the load-bearing corner portions of saw frame 210, while strengthening the overall rigidity of saw frame 210.

The ability to remove metallic material from saw frame 210 without reducing its rigidity allows saw frame 210 to be light-weight. A light-weight saw frame 210 shifts the center of gravity of hand-held saw 210 closer to saw blade 223 of hand-held saw 201. Shifting the center of gravity toward saw blade 223 is beneficial because a user of hand-held saw 201 may better feel or identify the point of contact between saw blade 223 and the material being cut, and thereby maneuver hand-held saw 201 accurately in response to the tactile sensations created by the cutting process.

Figure 4:
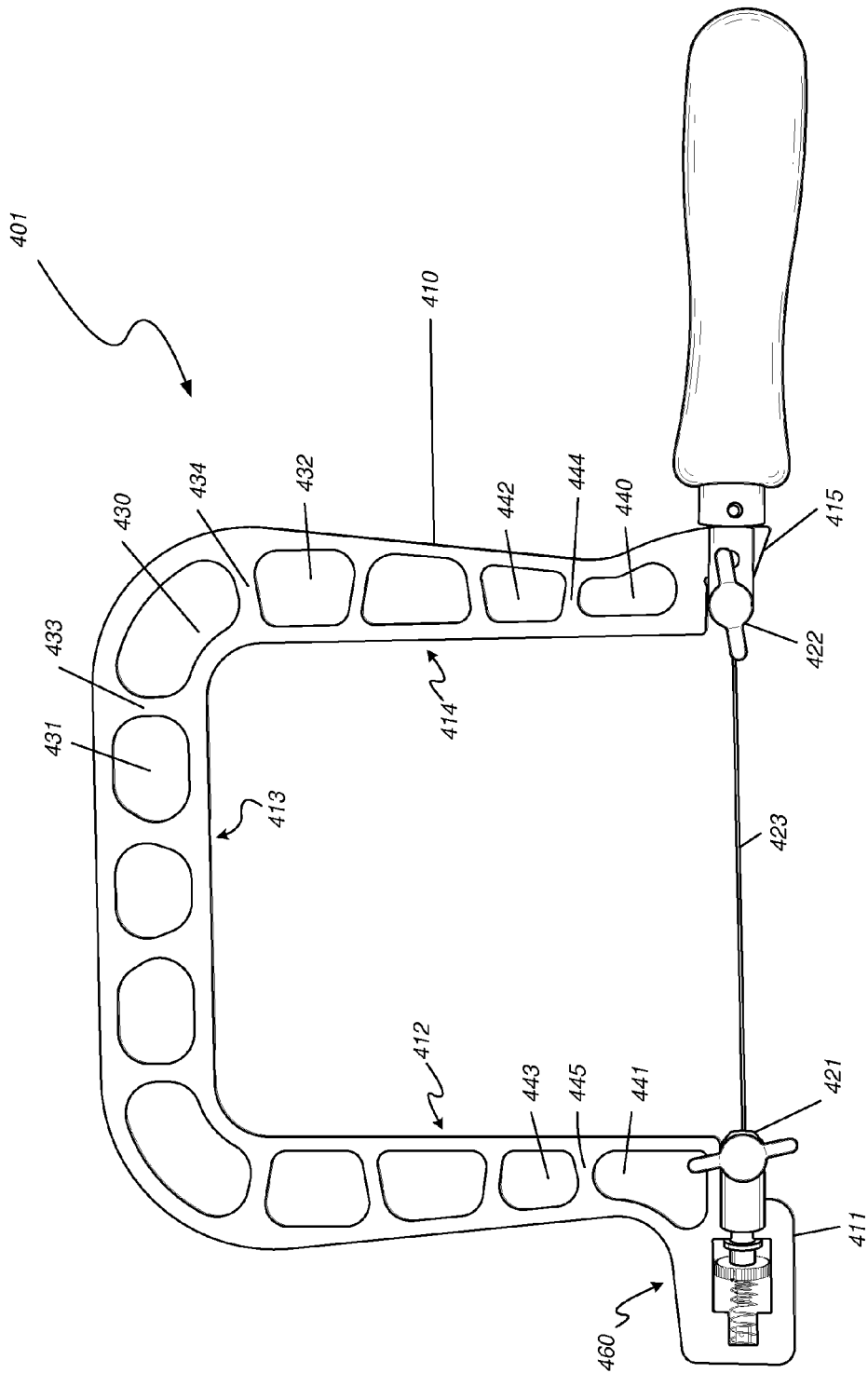
FIG. 4 is a side view of another embodiment of a hand-held saw.

It should be recognized that the truss-like structure of saw frame 210 may be formed by openings of various sizes and shapes, located at various locations of saw frame 210. For instance, FIG. 4 illustrates another embodiment of hand-held saw 401 with rigid saw frame 410. Saw frame 410 has an opening 430 located at the corner between right side 414 and top side 413. Opening 430 forms a straight member 433 with opening 431, and another straight member 434 with opening 432. As discussed above, it is possible but not necessary for the straight members of a truss-like structure to be joined at nodes. In saw frame 410, straight members 433 and 434 are adjacent but can be viewed as not joined together at a node. Regardless of whether straight members 433 and 434 are joined, the truss-like structure formed by openings 430, 431, and 432 in saw frame 410 is able to distribute an external force borne by the corner of 430 onto the other straight members of saw frame 410. For example, straight member 444, like straight members 433 and 434, would bear some of the force caused by the tensioning of saw blade 423.

Similarly, additional openings may be located on saw frame 410. For instance, opening 440 is located at proximal end 415 of saw frame 410, and opening 441 is located at distal end 411 of saw frame 410. Openings 440 and 442 form straight member 444 that is also part of the truss-like structure of saw frame 410. Likewise, openings 441 and 443 form additional straight member 445.

4. Handle

Referring back to FIG. 2, handle 216 is attached to proximal end 215 of saw frame 210. Handle 216 is oriented such that an axis formed by the length of handle 216 is aligned with the axis formed by the length of saw blade 223. In the present embodiment, handle 216 and saw blade 223 are approximately coaxial. It should be recognized, however, handle 216 and saw blade 223 may be offset.

5. Tensioning Device

Figure 6:
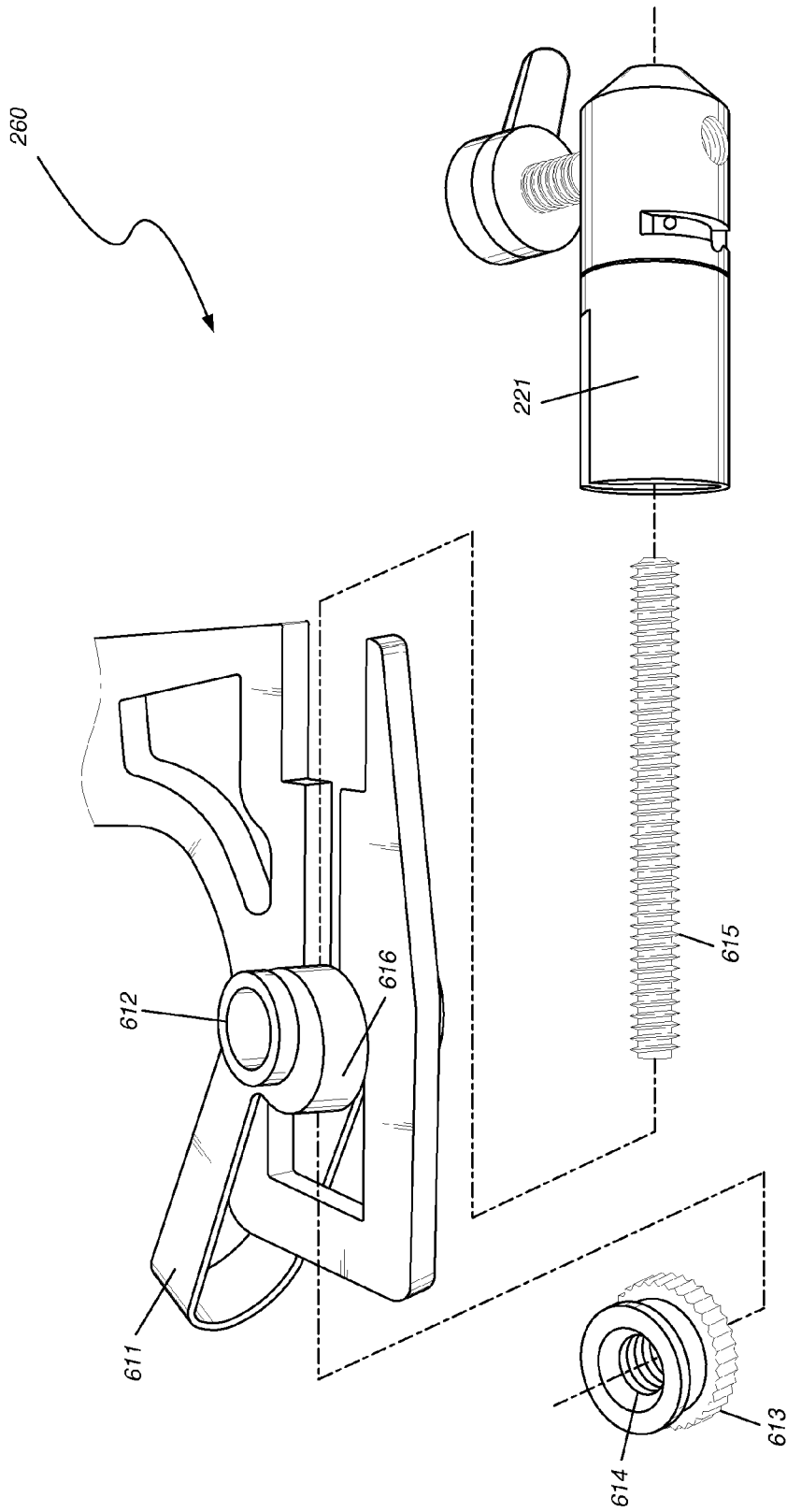
FIG. 6 is an exploded view of a saw blade tensioning device of the hand-held saw depicted in FIG. 2.

While still referring to FIG. 2, and simultaneously turning to FIG. 6, an adjustable tensioning device 260 of the hand-held saw is illustrated. As discussed above, saw blade 223 is coupled to saw frame 210 at distal coupling device 221 and proximal coupling device 222. Saw blade 223 is kept in tension by tensioning device 260 located at distal end 211 of saw frame 210. Specifically, while proximal coupling device 222 secures one end of saw blade 223 to saw frame 210 in a stationary position, saw blade 223 is connected at the other end to adjustable tensioning device 260, via distal coupling device 221. Tensioning device 260 creates a tensile force on saw blade 223 by causing distal coupling device 221 to pull saw blade 223 away from proximal end 215, where saw blade 223 is held stationary. The tensile force created by tensioning device 260 causes saw blade 223 to tension, and thus, saw blade 223 becomes taut.

Referring now to FIG. 6, in one embodiment, tensioning device 260 is a cam lever mechanism, which includes a cam lever 611 with an off-axis pivot 612. A thumbscrew 613 with a threaded center portion 614 acts as an adjustable backstop against a side 616 of cam lever 611. A headless screw 615 is connected rotably at one end to thumbscrew 613 through an opening in cam lever 611, and is threadlocked at the other end to distal saw blade coupling device 221. A movement of cam lever 611 causes side 616 of cam lever 611 to push against, and thus move, thumbscrew 613 which rests against side 616. Since thumbscrew 613 is connected to saw blade coupling device 221 by headless screw 615, saw blade coupling device 221 is also moved by the movement of cam lever 611. Accordingly, the tensile force applied onto a saw blade that is coupled to saw blade coupling device 221 is varied by the positioning of cam lever 611.

Figure 7:
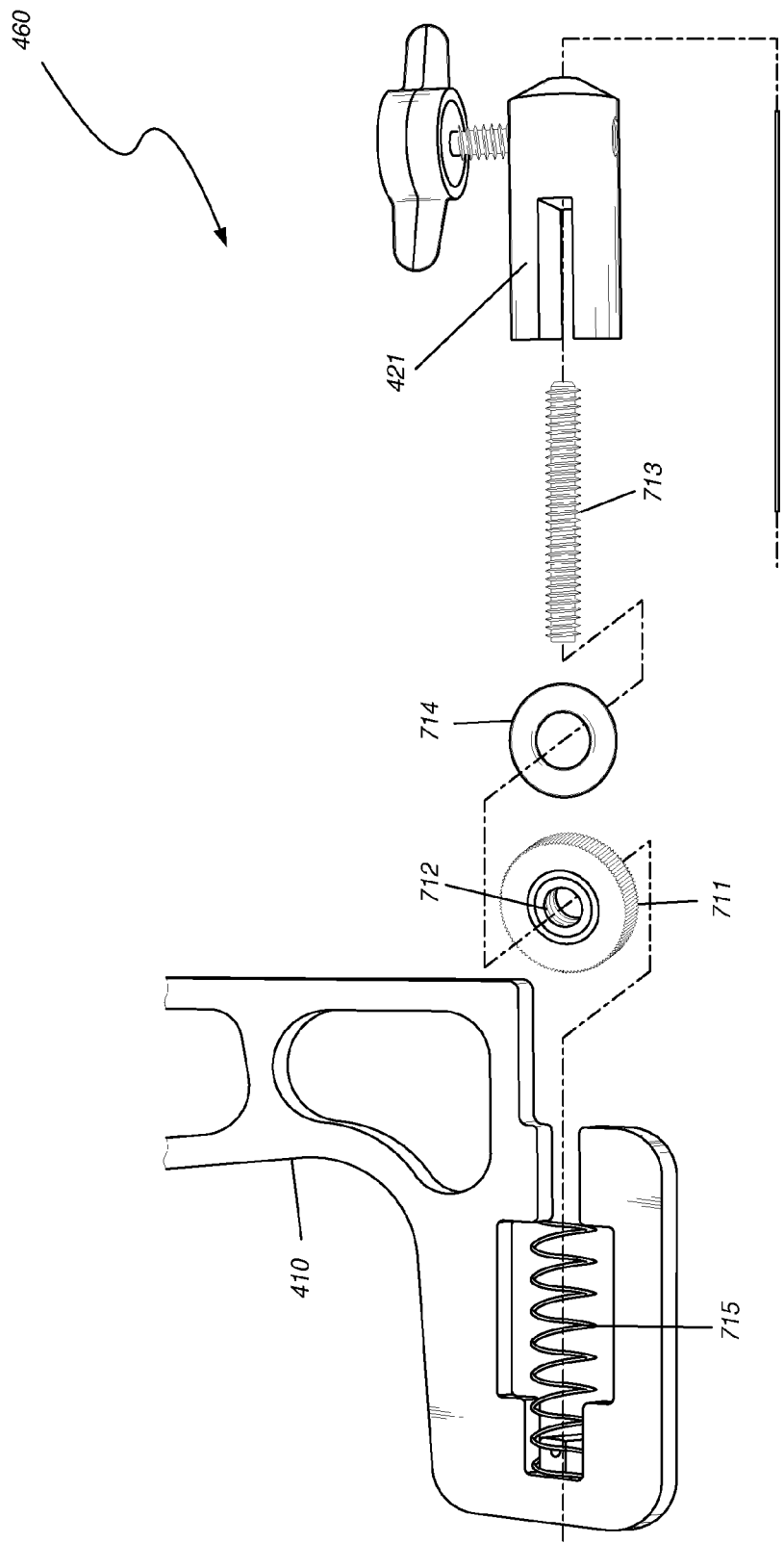
FIG. 7 is an exploded view of a saw blade tensioning device of the hand-held saw depicted in FIG. 4.

Referring now to FIG. 7, in another embodiment, the tensioning device 460 utilizes a thumbscrew 711, which includes a threaded center portion 712. A headless screw 713 is connected rotably at one end to the threaded center portion 712 of thumb screw 711, and is threadlocked at the other end to saw blade coupling device 421. Washer 714 facilitates the rotation of thumbscrew 711 by spacing the thumbscrew from saw frame 410, and retaining spring 715 ensures that the various components of tensioning device 460 remain assembled to saw frame 410. A rotation of thumbscrew 711 drives headless screw 713 into, or away from, the center threaded portion 712 of thumbscrew 711. Since the other end of headless screw 713 is threadlocked to saw blade coupling device 421, the rotation of thumbscrew 711 also moves saw blade coupling device 421. Thus, the tensile force applied onto a saw blade that is coupled to saw blade coupling device 421 is varied by the rotation of thumbscrew 711.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A hand-held saw, comprising:
    a unitary single-piece saw frame having a proximal end and a distal end, wherein the unitary single-piece saw frame has a top side, a distal side connected to an end of the top side, and a proximal side connected to another end of the top side;
    a first saw blade coupling device disposed at the distal end of the saw frame; a second saw blade coupling device disposed at the proximal end of the saw frame, wherein the first saw blade coupling device and the second saw blade coupling device is each adapted to securely couple a saw blade to the saw frame;
the saw blade securely coupled to the saw frame at the first saw blade coupling device and the second saw blade coupling device; and
    a handle coupled to the proximal end of the saw frame, wherein the handle is oriented such that a handle axis defined by a length of the handle is aligned with a cutting axis defined by the first saw blade coupling device and the second saw blade coupling device,
    wherein the unitary single-piece saw frame consists of only one unitary member,
    wherein the unitary single-piece saw frame has a plurality of through openings formed therein,
    wherein the plurality of through openings formed on the unitary single-piece saw frame comprises:
    a first through opening formed at a corner between the distal side of the saw frame and the top side of the saw frame;
    a second through opening formed at a corner between the proximal side of the saw frame and the top side of the saw frame;
    a third through opening at the distal end of the saw frame;
    a fourth through opening at the proximal end of the saw frame; and
    a fifth through opening at the top side of the saw frame, and
    wherein each of the plurality of through openings extends, along an axis perpendicular to the cutting axis, through the thickness of the unitary single-piece saw frame.

2. The hand-held saw of claim 1, wherein a width of the distal side of the saw frame is largest at a corner between the distal side of the saw frame and the top side of the saw frame.

3. The hand-held saw of claim 1, wherein the one or more openings form a truss-like structure on the saw frame.

4. The hand-held saw of claim 1, wherein the saw frame is cut from a single plate of a metal, and wherein the metal is selected from the group consisting of aluminum, titanium, and steel.

5. The hand-held saw of claim 1, wherein the length of the handle is further aligned approximately coaxially with the axis defined by the first saw blade coupling device and the second saw blade coupling device.

6. A hand-held saw, comprising:
    a unitary single-piece saw frame having a proximal end and a distal end, wherein the unitary single-piece saw frame has a top side, a distal side connected to an end of the top side, and a proximal side connected to another end of the top side;
    a first saw blade coupling device disposed at the distal end of the saw frame;
    a second saw blade coupling device disposed at the proximal end of the saw frame, wherein the first saw blade coupling device and the second saw blade coupling device are oriented to securely couple with a saw blade; and
    a handle coupled to the proximal end of the saw frame, wherein the handle is oriented such that a handle axis defined by a length of the handle is aligned with a cutting axis defined by the first saw blade coupling device and the second saw blade coupling device,
    wherein the unitary single-piece saw frame consists of only one unitary member,
    wherein the unitary single-piece saw frame has a plurality of through openings formed therein,
    wherein the plurality of through openings formed on the unitary single-piece saw frame comprises:
    a first through opening formed at a corner between the distal side of the saw frame and the top side of the saw frame;
    a second through opening formed at a corner between the proximal side of the saw frame and the top side of the saw frame;
    a third through opening at the distal end of the saw frame;
    a fourth through opening at the proximal end of the saw frame; and
    a fifth through opening at the top side of the saw frame, and
    wherein each of the plurality of through openings extends, along an axis perpendicular to the cutting axis, through the thickness of the unitary single-piece saw frame.

7. The hand-held saw of claim 6, wherein a width of the distal side of the saw frame is largest at a corner between the distal side of the saw frame and the top side of the saw frame.

8. The hand-held saw of claim 6, wherein the one or more openings form a truss-like structure on the saw frame.

9. The hand-held saw of claim 6, wherein the saw frame is cut from a single plate of a metal, and wherein the metal is selected from the group consisting of aluminum, titanium, and steel.

10. The hand-held saw of claim 6, wherein the length of the handle is further aligned approximately coaxially with the axis defined by the first saw blade coupling device and the second saw blade coupling device.

11. A method of assembling a hand-held saw, comprising:
    obtaining a unitary single-piece saw frame having a proximal end and a distal end, wherein the unitary single-piece saw frame has a top side, a distal side connected to an end of the top side, and a proximal side connected to another end of the top side connecting a first saw blade coupling device to the distal end of the saw frame;

connecting a second saw blade coupling device to the proximal end of the saw frame, wherein the first saw blade coupling device and the second saw blade coupling device are oriented to securely couple with a saw blade; and coupling a handle to the proximal end of the saw frame, wherein the handle is oriented such that a handle axis defined by a length of the handle is aligned with a cutting axis defined by the first saw blade coupling device and the second saw blade coupling device, wherein the unitary single-piece saw frame consists of only one unitary member, wherein the unitary single-piece saw frame has a plurality of through openings formed therein, wherein the plurality of through openings formed on the unitary single-piece saw frame comprises:

a first through opening formed at a corner between the distal side of the saw frame and the top side of the saw frame;

a second through opening formed at a corner between the proximal side of the saw frame and the top side of the saw frame;

a third through opening at the distal end of the saw frame;

a fourth through opening at the proximal end of the saw frame; and a fifth through opening at the top side of the saw frame, and wherein each of the plurality of through openings extends, along an axis perpendicular to the cutting axis, through the thickness of the unitary single-piece saw frame.

12. The method of claim 11, further comprising:

coupling a saw blade to the saw frame at the first saw blade coupling device and the second saw blade coupling device.

\* \* \* \* \*